United States Patent [19]

Sawa et al.

[11] 4,294,697
[45] Oct. 13, 1981

[54] APPARATUS FOR TREATMENT OF SEWAGE

[75] Inventors: Toshio Sawa; Masayoshi Kubota; Sankichi Takahashi; Toyohiko Kaneko, all of Ibaraki, Japan

[73] Assignee: Hitachi, Ltd., Tokyo, Japan

[21] Appl. No.: 60,475

[22] Filed: Jul. 25, 1979

[30] Foreign Application Priority Data

Mar. 22, 1979 [JP] Japan .................................. 54/34592

[51] Int. Cl.³ ............................ C02F 1/24; B03D 1/00
[52] U.S. Cl. ................................... 210/221.1; 210/243
[58] Field of Search ................... 210/44, 221 M, 221.1, 210/269, 243, 707; 204/149

[56] References Cited

U.S. PATENT DOCUMENTS

| | | | |
|---|---|---|---|
| 3,505,188 | 4/1970 | Pan | 210/44 X |
| 3,525,437 | 8/1970 | Kaeding et al. | 210/44 X |
| 3,726,780 | 4/1973 | Harnden et al. | 210/44 X |
| 3,989,608 | 11/1976 | DeMonbrun et al. | 204/149 |
| 4,094,755 | 6/1978 | Moeglich | 210/44 X |

FOREIGN PATENT DOCUMENTS

49-89676  8/1974  Japan .

Primary Examiner—Thomas G. Wyse
Attorney, Agent, or Firm—Thomas E. Beall, Jr.

[57] ABSTRACT

The present invention relates to an apparatus for removing suspended matter, organic matter and nitrogen compounds in the sewage. A processing tank is provided with a floating-separation zone at the upper portion thereof and an electrolysis zone below the floating-separation zone. A bed of porous adsorbent is disposed in the electrolysis zone and electrodes are disposed among the adsorbent. Bubbles generated upon the feed of current to the electrodes rise up through the floating-separation zone to remove the suspended matter and the organic matter in the sewage before introducing the sewage into the electrolysis zone. The porous adsorbent is polarized by the feed of current to the electrodes and results in removing matter remaining in the sewages, especially nitrogen compounds.

12 Claims, 4 Drawing Figures

APPARATUS FOR TREATMENT OF SEWAGE

BACKGROUND OF THE INVENTION

1. Field of the Invention

This invention relates to an apparatus for the treatment of sewage or waste water to re-use as a usable water. More particularly, the invention relates to an apparatus for the treatment of sewage to remove suspended matter, organic matter, foaming matter and so on contained in the sewage therefrom.

2. Description of the Prior Art

In recent years, ration of the supply of the city water as well as restriction of the sewage have been tightened and re-use of the water has become all the more necessary especially in urban communities. Under such circumstances, a concentrated purification installation and a water re-use recycling system have been used in newly constructed buildings in cities or in housing developments partly because of absence of sufficient sewage system capable of processing great quantities of sewage. Such recycling systems are referred to as a "re-use system" or as a "water re-use processing system" in contrast with the conventional water supply and sewage systems.

Applications of the reused water are versatile and varied. At present, however, the reused water is used in the fields such as flush water for flush toilets, water for air-conditioning, water for car cleaning and water for leisure applications.

As a general standard for the water quality, it has been believed necessary that the reused water should contain, in the case of the flush water for the flush toilets, up to 10 ppm of suspended matter, up to 20 ppm of organic matter, up to 5 ppm of foaming matter, up to 20 ppm of nitrogen compounds and desirably the number of *Escherichia coli* of up to 1,000/ml. When the reused water is used for air-conditioning, car cleaning or leisure purposes, it is believed necessary as the water quality standard that the water should contain up to 5 ppm of suspended matter, up to 10 ppm of organic matter, up to 1 ppm of foaming matter, up to 10 ppm of nitrogen compounds and the number of *Escherichia coli* of up to 1,000/ml.

The water re-use processing systems that have so far been proposed to satisfy the abovementioned water quality standards consist principally of a biochemical processing or a physicochemical processing. The former comprises, as a principal method, an active sludge method and a spray filtration bed method used in the conventional sewage processing in combination with a foam sedimentation-separation method and (or) a sand filtration method. However, this processing system involves the drawback in that the installation space is large and the processing speed is slow.

For the abovementioned reason, the latter using the physicochemical processing method has been attempted.

As disclosed in Japanese Patent Laid-Open No. 89676/1974, removing first suspended matter by electrolytic floating and separation, carrying out then again the floating separation to remove the rest of suspended matters and thereafter decomposing organic matter having COD or BOD by means of the electrolytic oxidation. Though this method uses two water processing methods, i.e., the floating-separation method and the electrolytic oxidation method, the method has not yet come to provide sufficient effects as a water re-use system and to satisfy the aforementioned water quality standards.

SUMMARY OF THE INVENTION

The present invention is directed to cope with the abovementioned problems and an object of the invention is to provide a water-re-use processing capable of effectively removing the suspended matter, organic matter, foaming matter and nitrogen compounds, and capable of the continuous treatment of the sewage.

One characteristic of the invention is in that the structure is provided with a floating-separation zone formed at the upper portion thereof and an electrolysis zone in combination with a fixed bed of porous adsorbent and electrodes disposed among the absorbent, formed below the floating-separation zone, whereby the suspended matter and organic matter in the sewage are removed by the utilization of bubbles generated upon the feed of current to the electrodes and the nitrogen compounds are adsorbed in each adsorbent polarized through said feed of current.

Another characteristic of the invention is in that the structure is provided with means or a cylinder regulating a flow of sewage disposed in the floating-separation zone, whereby the transferred sewage is caused to rise up in the means or the cylinder. In accordance with the structure, before introducing the sewage into the electrolysis zone, the suspended matter and the organic matter are removed by the bubbles and floated. Thus, the pile of the suspended matter and the organic matter is prevented or minimized.

DETAILED DESCRIPTION OF THE PREFERRED EMBODIMENTS

The method and the apparatus of the present invention will be explained in detail by referring to the accompanying drawings.

Figure 1:
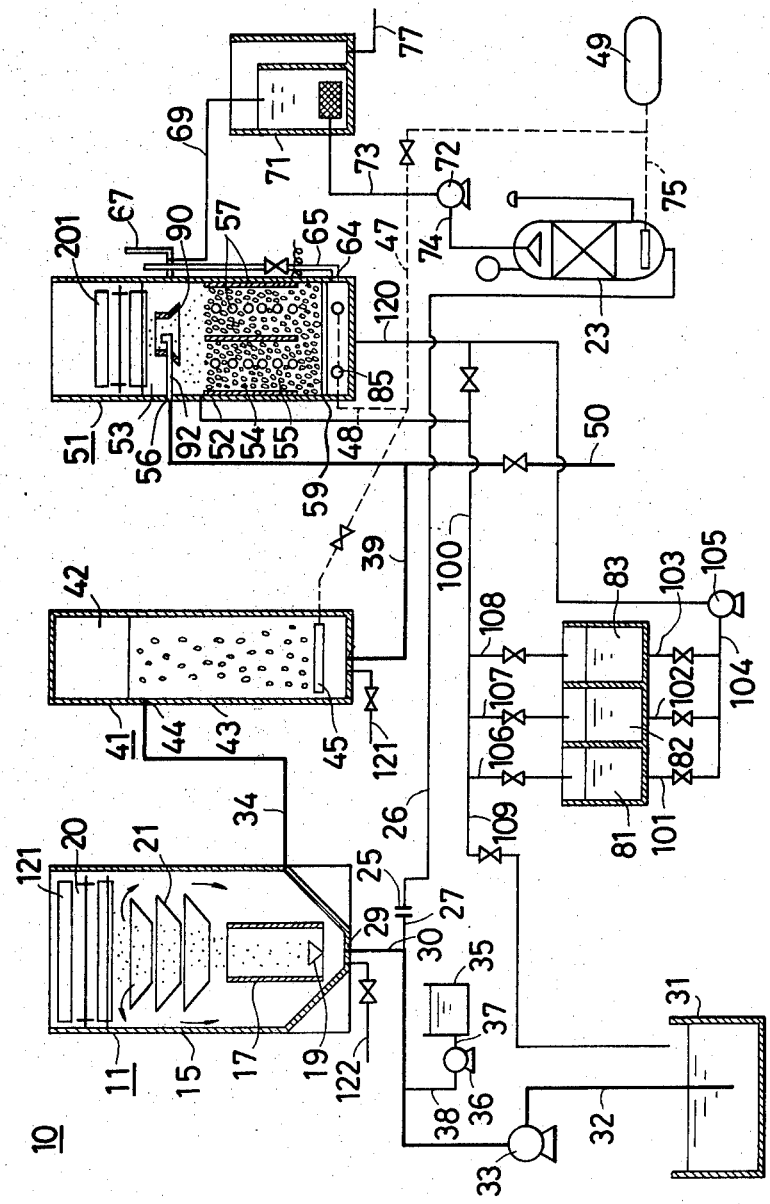
FIG. 1 is a view illustrating a system of the present invention.
Figure 3:
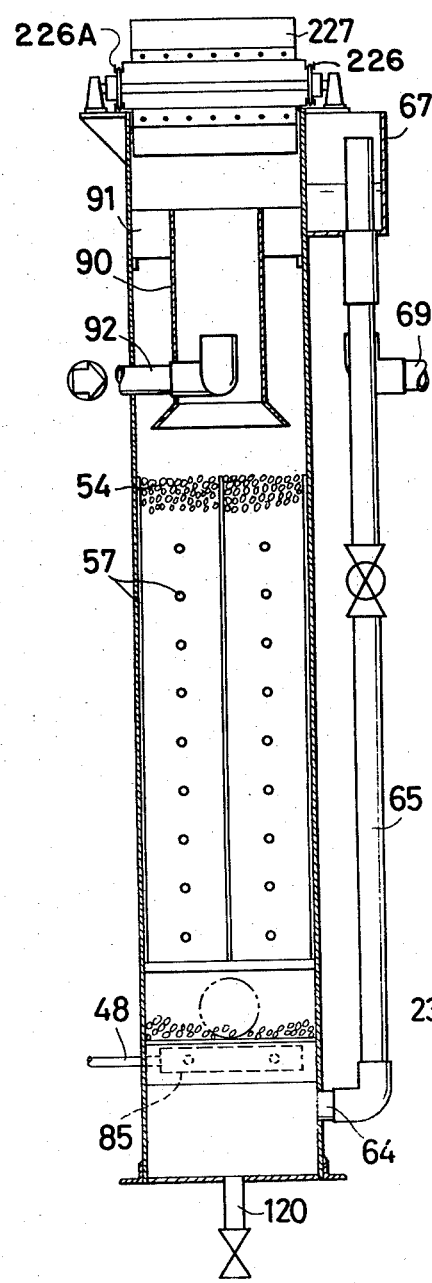
FIG. 3 is a side view of FIG. 2, including a partial sectional view and, FIG. 4 is a plane view of FIG. 2.
Figure 2:
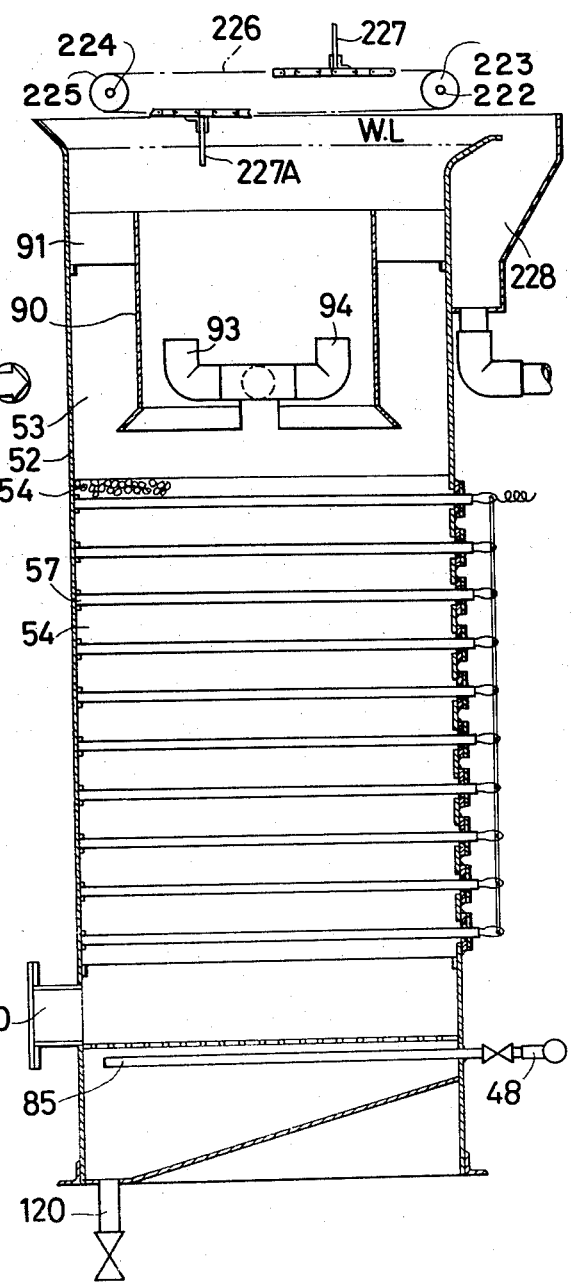
FIG. 2 is a front view, including a partial section view, illustrating a main portion of the system of FIG. 1 in detail.
Figure 4:
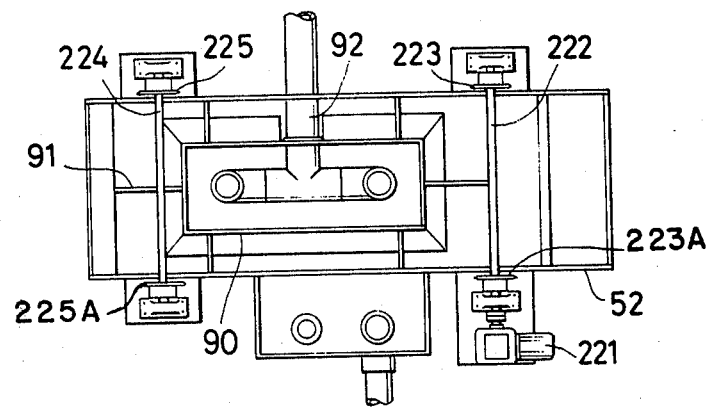

Referring to FIG. 1 illustating a whole system of the present invention and FIGS. 2 to 4 illustrating a main portion of the system, in FIG. 1, a processing device 10 comprises a pressurizing-separation device 11, a foam-floating-separation device 41 and a packed electrolytic floating-separation device 51. These three devices are independently installed and connected with each other by conduits 34, 39.

The pressurizing floating-separation device 11 comprises a pressurizing floating-separation tank 15, a mixing cylinder 17 mounted in the tank 15, a bubble dispersing plate 19 mounted in a lower portion of the cylinder 17, a floc growth-promoting device 21 disposed in the descending flow zone near the tank wall, a pressurized water production apparatus 23 and a pressure reduction device 25 connected to the pressurized water production apparatus 23 through a conduit 26. A floating flocs collecting chamber 20 is formed at an upper portion of the tank. A sewage intake port 29 is formed at the end portion of the tank 15 and a conduit 30 is connected therewith. The sewage collected in a reservoir tank 31 is conducted to the tank 15 through a conduit 32, a pump 33 and conduit 30. Flocculant reserved in a flocculant tank 35 is conducted into conduit 30 through a pump 36 and conduits 37, 38. The conduit 30 is connected with the pressure reduction device 25 by means of a conduit 27.

The foam floating-separation device 41 comprises a foam floating-separation tank 43, an air spray tube 45 with a number of small apertures and an air source tank 49 connected with the tube 45 through a conduit 47. A floating foam collecting chamber 421 is formed at the upper portion of the tank 43.

The packed electrolytic floating-separation device 51 mainly comprises a processing tank 52 in which a floating zone 53 is formed at the upper portion and an electrolysis zone 54 is formed at the lower portion, a fixed bed 55 of granular active carbon packed in the processing tank 52 as the electrically conductive porous adsorbent forming the electrolysis zone and a plurality of support electrodes 57 of anodes and cathodes horizontally and vertically disposed among the bed 55. The electrodes are made of ferrite. The active carbon bed 55 and the support electrodes 57 are supported by a support plate 59 mounted on the processing tank 52. The support plate 59 is provided with a number of small apertures 60 for passing the treated sewage. A dispersing water tube 63 which is connected with a sewage intake port 61 is disposed in the floating zone 53 of the processing tank 52 in such a way that the sewage is conducted to the packed electlytic floating-separation device 51.

The treated water is temporarily reserved in a reservoir tank 71 by means of a conduit 65, a take-out tank 67 and a conduit 69, and, after that, is provided for the utilization as a re-use water. One portion of the treated water pressurized by a pump 72 is sent to the pressurized water production apparatus 23 through conduits 73, 74 to contact with air conducted from the air source tank 49 through a conduit 75 and, after that, recycled to the pressurized floating-separation device 11. The rest of treated water is discharged from a conduit 77 for a re-use of water as abovementioned.

As already described, the electrolytic floating-separation device 51 performs the purification of the sewage by means of adsorption on the adsorbent such as the active carbon. If the device is kept used continuously, the suspended matter and foaming matter attach to the surface of the adsorbent and close its fine pores, thereby lowering the adsorption capacity. In order to prevent this trouble, the adsorbent is washed, i.e., so-called regeneration is carried out after a predetermined period of use. Washing for regeneration comprises the three steps, i.e., the first step of washing with water and an acid, the second step of feeding a current while causing an electrolyte such as Nacl to flow and the third step of electrolytic washing. Tanks 81, 82, 83 respectively store the water, the acid and the electrolyte. In performing the washing with water, it is preferrable to carry out a bubble washing simultaneously. For this purpose, pressurized air is transferred from an air spray tube 85 from the air source tank 49 through conduit 47, 48.

In performing the regeneration of the adsorbent, the water, the acid and the electrolyte are, in turn, transferred to the lower portion of the processing tank 51 though conduits 101, 102, 103, 104, a pump 105 and a conduit 120.

The water, the acid and the electrolytic used for the washing with water, acid and electrolyte are, in turn, returned to the tanks 81, 82, 83 by means of conduits 100, 106, 107, 108.

The primary washing water is returned to the reservoir tank 31 through conduit 109. Upon discharging from the tanks 15, 43, 52, the sewage is discharged through conduits 120, 121, 122 connected with the bottom of each tank.

According to the abovementioned embodiment, it is possible to produce an apparatus having excellent water re-use processing efficiency in a compact style. In addition, since the sewage after the addition of the flocculant can be allowed to flow without using a pump, the apparatus is free as possible of the problem of breakage of the flocs and enhances its floating-separation performance. Further, the apparatus is extremely advantageous also from the aspect of its maintenance because dilution treatment of the toxic gases is possible.

In the apparatus of the present invention, the sewage is first stored in the tank 31. The flocculant is then added to the sewage by the flocculant addition tank 35. The sewage reaches the pressurizing floating device 11 while forming flocs due to the flocculation.

In the floating zone, the sewage is introduced from the intake port together with fine bubbles of 50-150 $\mu$m, which are formed by returning the pressurized water of 2-5 atg dissolving therein the air pressure-fed in the pressurizing water production apparatus 23 by means of the pressure reduction device 25 to the normal pressure, and they are mixed with each other by means of the bubble dispersing plate 19. In this manner, the suspended matter and the organic matter contained in the sewage are mainly mixed with the flocculant in the cylinder 17 by means of the dispersing plate 19, turned into flocs and rise up in the floating zone while attaching to, and being carried over, by the bubbles. The descending flocs that can not complete the rise are gathered mutually into now flocs by the growth-promating device 21 and then float upward.

The scum SI thus floated is caused to overflow for removal by a suitable scraping means such as a scum skimmer 121. The separated water is transferred to the foam floating-separation device 41 through the piping 34. In the foam floating-separation device 41, an intake port 44 for the sewage is formed at the upper portion of the tank 43 and a take-out port is formed at the bottom thereof leading to conduits 9. The floating zone is formed above the air spray tube 45. A number of small apertures of 100-200 $\mu$m are bored on the air spray tube 45 and the air transferred through the conduit 47 is turned into bubbles of 1-5 mm from these apertures and rises in the floating zone. Because of the bubbles, the foaming matter in the sewage is turned into foam together with the introduced bubbles and floats up on the water level (W.L.). The foam thus floated is caused to overflow for removal from a take-out port (not shown) as a condensed water containing foam forming materials. The separated water processed in this manner is taken out from piping 39, 50, applied with chlorine sterilization and then used as the flush water for the flush toilet.

For the purpose of third treatment for the sewage, the rest of the separated water flows through the piping 39, 50 and is led into the packed electrolytic floating-separation device 51.

The packed electrolytic floating-separation device 51 comprises the tank 52 equipped at its upper portion with an intake port 56 and at its lower portion with a take-out port 64. Inside the processing tank 52, there are formed the floating zone at the upper portion and the electrolysis zone at the lower portion. The sewage entering the processing tank 52 from the intake port 56 first descends into the electrolysis zone 54 through the floating zone 53.

In the floating-separation zone of the tank 52, a cylinder 90 for regulating a flow of the sewage is mounted on the tank 52 by means of supporting plates 91. A piping 92 extending from an intake port 56 is divided to two pipings 93, 94 in the cylinder 90. The pipings 93, 94 are open in the upward direction. The lower portion of the cylinder 90 is of a skirt 95 and opens toward the bed of adsorbent.

According to the cylinder 90, the sewage transferred through pipings 92, 93, 94 flows upwardly in the cylinder 90. At the same time, bubbles of hydrogen and oxygen are also conducted into the cylinder 90. Thus, the remaining suspended matter and organic matter attach to the bubbles and are caused to float together with bubbles.

Since the scums S3 are immediately skimmed by the skimmer 201 to a take-out port 228, the sewage descending around the cylinder 90 hardly contains the suspended matter and the organic matter. As a result, it is possible to make the pile of the suspended matter and the organic matter extremely smaller on the bed of adsorbent, so that a continuous operation of the adsorbent becomes possible. It is very important to continuously treat the sewage.

Granular active carbon of bed 55 is as the electrically conductive porous adsorbent packed between the support electrodes 57 and a d.c. current is caused to flow through it from a power source (not shown) so that bubbles of a diameter of 100–200 $\mu$m of hydrogen and oxygen formed by the electrolysis further carry over and float the residual suspended matter and organic matter in the sewage. The scum S3 thus floated is caused to overflow for removal in the same manner as the scum S1 by a skimmer 201. On the other hand, the granular active carbon polarized by the feed of the current adsorbs the organic matter, the nitrogen oxides and the metal ions in the sewage. Chlorine formed by the discharge and present in the form of iron in the sewage sterilizes bacteria such as *Escherichia coli* contained in the sewage.

The processed water treated in this manner is discharged from the take-out port 64 through the conduit 65, the take-out tank 67, the conduit 69 to the reservoir tank 71 and used as the re-use water.

The inventors have discovered that, regarding an amount of electrolysis bubbles to be provided in the floating-separation of the tank 52, the range of $0.5 \times 10^{-4} - 2 \times 10^{-4}$ on the basis of the sewage quantity is practical to effectively remove the suspended matter and the organic matter remaining in the sewage. In this example, globular granular active carbon having a diameter of 8 mm were used and the current of 0.5–3 A (current density of 0.3–1.0 A/dm$^2$) was used.

The skimmer 201 comprises a driving shaft 222 connected with a motor 221, a pair of chain driving gears 223, 223A mounted on the driving shaft 222, a driven shaft 224, a pair of chain gears 225, 225A mounted on the driven shaft 224, a pair of chains 226, 226A driven by engaging with the chain gears and skimming plates 227, 227A connected with the chains. The scum S3 skimmed by the skimming plates 227, 227A is taken out from a take-out port 228.

The used adsorbent is discharged from a take-out port 230 for the adsorbent.

The packed electrolytic floating-separation method is extremely suitable for the water re-use processing method because it is able to synthetically remove the suspended matter, the organic matter, the foaming matter, the nitrogen compounds and further metal ions. In the packed electrolytic floating-separation method, the electrically conductive porous adsorbent such as a granular active carbon layer packed in the electrolysis zone is interposed between support electrodes consisting of at least one pair of anode and cathode and when a relatively high voltage is impressed across the support electrodes from a d.c. power source, each particle of the porous adsorbent is polarized and fine bubbles (of a diameter of about 100–200 $\mu$m) of hydrogen and oxygen are formed from the surface of each particle due to the electrolysis of the water. The adsorption force and the rising flow of these bubbles enable to float and separate the suspended matter and the organic matter that are yet present in the sewage. Further, when the current is fed to the porous adsorbent layer through the sewage, the organic matter, the nitrogen compounds and the metal ions in the sewage are effectively adsorbed onto the porous adsorbent layer due to the polarizing action of the adsorbent. Hereinafter, the explanation will be given on this phenomenon.

The metal ions contained in the sewage such as calcium ion are collected by the porous adsorption layer due to electrodeposition, inorganic ions such as nitric acid ion and nitrous acid ion and ammonium ion are collected due to occulusion and the organic matter is collected due to adsorption. In the present invention, these electrodeposition, occulusion and adsorption are called "adsorption" for the sake of convenience. Due to these adsorbing actions, the surfaces (including fine pores) of the porous adsorbent are contaminated and its adsorption capacity lowers. Especially when the suspended matter and the foaming matter attach to the surface of the adsorbent, the fine pores are closed so that the adsorption capacity of the adsorbent for the organic matter and for the nitrogen compounds decreases drastically. In order to prevent this lowering, it is preferred to keep the concentration of the suspended matter in the water to be processed no more than 20 ppm (more preferably no more than 10 ppm) and the concentration of the foaming matter no more than 5 ppm (more preferably no more than to 2 ppm) before carrying out the packed electrolytic floating. After operation over a predetermined period, it is also preferred to remove the suspended matter and the foaming matters by washing them off with water. In order to provide the porous adsorbent with a required adsorption capacity, it is also preferred to regenerate it by washing it with an acid or the feed of a current while a chloride is being added.

Table 1 illustrates the results of processing of the water after the foam floating-separation by the use of the abovementioned processing method. By this processing, the treated water can satisfy the water quality standard almost equivalent to that of the service water and can be used as the reused water for a wide range of applications.

According to this example, the treatment operation was continued for 74 hours.

TABLE 1

| | After foam floating-separation | After packed electrolytic floating-separation | Water quality standard |
|---|---|---|---|
| suspended matter | 10 | up to 5 | up to 5 |
| organic matter | 20 | up to 10 | up to 10 |
| foaming matter | 2 | up to 1 | up to 1 |
| nitrogen compounds | 20 | up to 10 | up to 10 |
| bubble/sewage | 5 | $4 \times 10^{-4}$ | |

Remarks:
unit = ppm

Upon regenerating the absorbent by means of washings with the water, the acid and the electrolysis, the table 2 shows the component-removing performance, the operation condition and the operation frequency.

TABLE 2

| Method | | Washing with water | Washing with acid | Passing of NaCl solution | Electrolysis of NaCl | Water washing |
|---|---|---|---|---|---|---|
| Component-removing performance | | Washing suspended matter and foaming matter | Dissolving of metal contents | $NH_4^{-1}$ $NO_2^{-}N$ substitution | Oxidation-decomposition of organic matters | NaCl washing |
| Operation Condition | | — | $H_2SO_4$:0.5% | NaCl:5% | DC charging $7.5 \frac{A \cdot H}{Ag \cdot Ac}$ | — |
| Frequency | once/day | 30 min. | — | — | — | — |
| | once/week | 30 min. | 30 min. | 1 hr. | 5 hr. | 30 min. |

What is claimed is:

1. An apparatus for the treatment of sewage comprising:
    a processing tank having a floating-separation zone formed at the upper portion therein and an electrolysis zone formed therein below the floating-separation zone;
    inlet means to introduce sewage into said tank in the float-separation zone;
    means regulating flow of the sewage into the tank comprising a cylinder mounted in the processing tank and said inlet means opening inwardly into the cylinder, said cylinder having a lower portion in the form of a skirt that opens downwardly so as to collect bubbles;
    means dividing the floating-separation zone into two portions;
    a fixed bed of electrically conductive porous adsorbant particles disposed in the electrolysis zone for adsorbing organic matter, nitrogen compounds and metal ions in the sewage;
    a plurality of anode and cathode electrodes disposed among the adsorbent particles;
    means supplying electric current to said electrodes thereby polarizing the individual absorbent particles and electrolyzing water to produce hydrogen and oxygen bubbles on the surface of each individual adsorbent particle, the rising flow of the bubbles floating suspended matter and organic matter upward into the floating-separation zone;
    means to discharge the suspended matter and organic matter attached to the bubbles out of the processing tank; and
    means to take out the sewage so that the sewage will pass from said inlet means to be treated through the floating-separation zone and the electrolysis zone out of the processing tank.

2. An apparatus for the treatment of sewage of claim 1, further comprising means for periodically regenerating the porous adsorbent means by conducting water, acid and electrolyte to the bed of adsorbent.

3. An apparatus for the treatment of sewage of claim 1 or 2, wherein granular active carbon is the adsorbent means.

4. An apparatus for the treatment of sewage of claim 1 or 2, wherein the electrodes are disposed vertically and horizontally.

5. An apparatus for the treatment of sewage comprising:
    a processing tank having a floating-separation zone formed at the upper portion therein and an electrolysis zone formed therein below the floating separation zone;
    a combination of a fixed bed of electrically conductive adsorbent particles disposed in said electrolysis zone with anode and cathode electrodes;
    inlet means to introduce sewage into said tank;
    means supplying electric current to said electrodes to electrolyze water generating bubbles that will rise in the sewage through said floating-separation zone;
    means comprising a cylinder having a downwardly opening skirt portion at its lower extremity, disposed in the floating-separation zone and dividing the floating-separation zone into two portions, for regulating a flow of the sewage so as to give the sewage a serial flow of first a rising flow of the sewage with said bubbles and a descending flow of the previously risen sewage with said inlet means introducing the sewage into said tank in said rising flow;
    means for discharging suspended matter and organic matter attached to the bubbles out of the processing tank; and
    means for discharging the sewage so that the sewage will pass from said inlet means to be treated through the floating-separation zone and the electrolysis zone out of processing tank.

6. An apparatus for the treatment of sewage of claim 5, wherein said adsorbent means comprises granular adsorbent, and
    the electrodes are disposed among the adsorbent to polarize individual adsorbent.

7. An apparatus for the treatment of sewage of claim 5, further comprising a pre-treatment means to remove suspended matter, organic matter and foaming matter in the sewage upstream of and feeding said inlet means.

8. An apparatus for the treatment of sewage of claim 5, wherein said porous adsorbent means, when polarized, will remove metal ions from the sewage by electrodeposition onto the porous adsorbent, will remove the nitrogen compounds by occlusion, and will remove organic matter by adsorption on the adsorbent.

9. An apparatus for the treatment of sewage of claim 8, wherein said means for supplying electric current and producing bubbles produces the bubbles as hydrogen gas and oxygen gas in an amount of $0.5 \times 10^{-4}$ to $2 \times 10^{-4}$, as a ratio of the quantity of bubbles to the quantity of sewage, and further produces the bubbles with a diameter of 100 to 200 $\mu$m.

10. An apparatus for the treatment of sewage of claim 5, wherein said regulating means is a partition dividing said floating-separation zone into two portions, with said sewage and bubbles having said rising flow within a first one of said portions and a descending flow in the second one of said portions.

11. An apparatus for the treatment of sewage of claim 10, wherein said porous adsorbent means, when polarized, will remove metal ions from the sewage by electrodeposition onto the porous adsorbent, will remove the nitrogen compounds by occlusion, and will remove organic matter by adsorption on the adsorbent.

12. An apparatus for the treatment of sewage of claim 11, wherein said means for supplying electric current and producing bubbles produces the bubbles as hydrogen gas and oxygen gas in an amount of $0.5 \times 10^{-4}$ to $2 \times 10^{-4}$, as a ratio of the quantity of bubbles to the quantity of sewage, and further produces the bubbles with a diameter of 100 to 200 $\mu$m.

* * * * *